INVENTORS.
SHICHIZAEMON MOGI
RYOZO TOEI
BY SHIGENORI FUNAKI

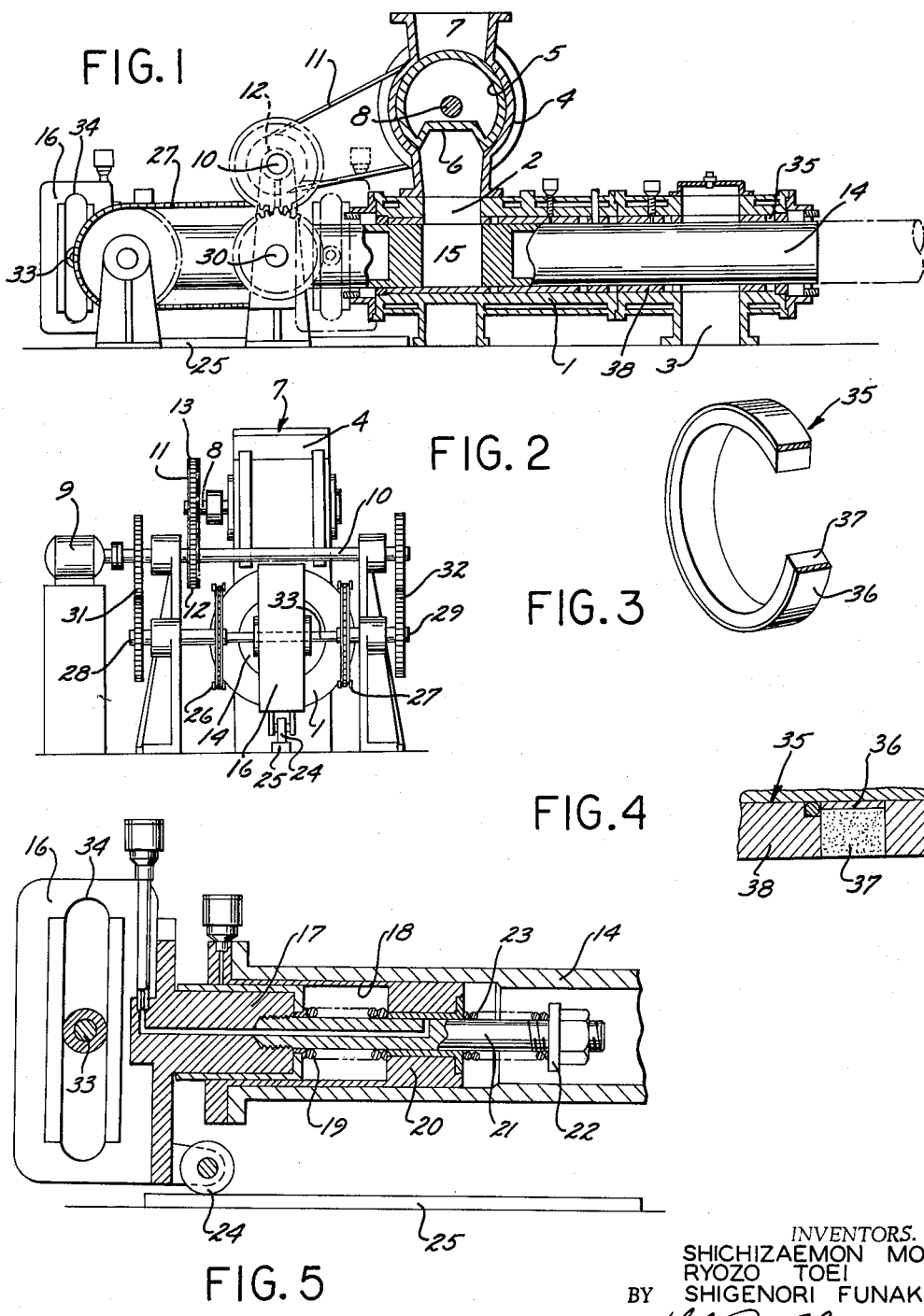

ATTORNEY

United States Patent Office 3,233,790
Patented Feb. 8, 1966

3,233,790
APPARATUS FOR AIRTIGHT TRANSFER
OF SOLID PARTICLES
Shichizaemon Mogi, Chiba-ken, Ryozo Toei, Kyoto, and Shigenori Funaki, Osaka, Japan, assignors to Kikkoman Shoyu Kabushiki Kaisha, Chiba-ken, Japan, Kabushiki Kaisha Kurimoto Tekkosho, Osaka, Japan, both Japanese corporations, and Ryozo Toei, Kyoto, Japan
Filed Dec. 30, 1963, Ser. No. 334,445
5 Claims. (Cl. 222—254)

This invention relates to equipment for the continuous transfer of solid grains or granules or similar bodies in an airtight conveyor, and more particularly to the equipment including a reciprocating or rotary piston for the transfer of such solid bodies continuously between apparatuses which are under different pressures. This transfer is accomplished while shutting off such differences in pressure which may exist, or the shutting off of the circulation or the leakage of gas or vapor between these apparatuses.

Generally between such apparatuses as a pressurized reactor or extractor, where the pressure is high or oppositely between the vacuum apparatus or dryer where it is often necessary to continuously transfer granules or powders while shutting off the difference in pressure or the circulation of gas between these apparatuses. There also are cases of drying with super heated vapor or absorbing gas where, regardless of such differences in pressure, it is desirous to prevent a dangerous gas from escaping, or useful gas which can be recovered, and preventing the gases from accompanying the solid bodies as they are transferred, and thus leaking the gases into the open air or to pass the gases into the apparatus where the solid bodies are to be acted upon.

An object of the present invention is to provide equipment, including a reciprocating or rotary piston which is capable of transferring solid bodies or granules or powders between apparatuses as mentioned above, while completely shutting off the circulation of any gas between these apparatuses.

Other objects, advantages and features of invention may appear from the accompanying drawings, the subjoined detailed description and the appended claims.

In the drawings:

FIGURE 1 is a side elevation partly in section of our airtight transfer of solid particles.

FIGURE 2 is an end view of the same.

FIGURE 3 is a perspective view of one of the packing rings.

FIGURE 4 is a fragmentary transverse sectional view of one of the packing rings.

FIGURE 5 is a fragmentary longitudinal sectional view of one end of our apparatus.

Figure 7:
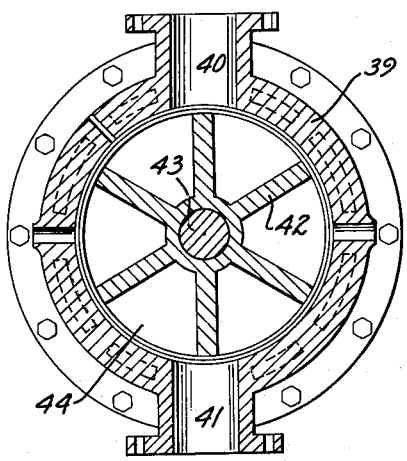
FIGURE 7 is a sectional view taken on line 7—7 of FIGURE 6.

Referring more particularly to the drawing, the numeral 1 indicates an elongated cylinder which is formed with an intake opening 2 adjacent one end thereof and preferably in the top, and with an outlet port 3 adjacent the other end thereof and preferably in the bottom. A hopper 4 is fixedly mounted on the cylinder 1 over the intake port 2 and this hopper has a rotary piston 5 mounted therein and continuously rotated, as will be subsequently described. The piston 5 is formed with a pocket 6 and this pocket alternately aligns with the intake 7 of the hopper 4 and the port 2. Thus solid particles or granules which are fed into the intake 7 of the hopper 4 will be transferred in the pocket 6 to the intake 2 as the piston 5 rotates. The piston 5 is mounted on a shaft 8 and this shaft is journaled in the hopper 4 in suitable bearings. The shaft 8 and the rotary piston 5 are continuously rotated by means of the electric motor 9 which drives the shaft 10. A belt 11 encircles the pulleys 12–13 on the shafts 10 and 8 respectively, thus continuously rotating the shaft 8 and the rotary piston 5.

A feed bar 14 is mounted in the cylinder 1 and this feed bar is continuously moved back and forth between a position in which the transfer hole 15 in the feed bar is positioned under the intake 2, and where that feed bar is positioned over the outlet 3. Thus in the position of the parts shown in FIGURE 1, solid particles or granules are dumped from the pocket 6 through the intake port 2, and thence into the hole 15. In the other position of the feed bar 14 where it is extended to the right, the feed hole 15 will be positioned over the outlet 3 and thus transferred to another apparatus (not shown), which is either at a higher or lower pressure than is the apparatus which is mounted on top of the hopper 4, and which feed solid particles or granules into this hopper and thence into the pocket 6, as previously described. The feed bar 14 may be hollow at both the front and rear ends thereof, so as to reduce the weight of this bar if it is desirable to provide such a structure.

To impart a continuous reciprocating motion to the feed bar 14 within the cylinder 1, the following structure is provided: The feed bar 14 projects out of one end of the cylinder 1, and a crosshead 16 is mounted in the feed bar by means of the following structure. A pintle 17 projects from the crosshead 16 and slidably fits within a sleeve 18 mounted in the end of the feed bar 14. A spring 19 is positioned between the closed end 20 of the sleeve 18 and the inner end of the pintle 17, thus yieldably pressing the pintle 17 towards the open end of the feed bar 14. A bar 21 is threaded into the end of the pintle 17 and extends through the closed end 20 of the sleeve 18, and the inner end of the bar is formed with a shoulder 22. A spring 23 is positioned between the inner end of the sleeve 18 and the shoulder 22, thus tending to counterbalance the spring 19 and to hold the crosshead 16 between the tensions of two springs, which will avoid shock on the crosshead 16 at both ends of the reciprocating travel of the feed bar 14, that is, when the feed bar comes to a stop at both ends of its travel. A roller 24 rides on the track 25 as the feed bar 14 is moved back and forth during the feed operation.

Reciprocating motion is imparted to the feed bar 14 through the crosshead 16 as follows: A pair of chains 26–27 are positioned one on each side of the crosshead 16, and these chains extend parallel to the feed bar 14. The chain 26 extends over a sprocket on the drive shaft 28 at one end thereof and over a similar sprocket on a shaft at the other end thereof. Similarly, the chain 27 extends over a sprocket on the drive shaft 29 at one end thereof and over a sprocket on an idler shaft 30 at the other end thereof. The drive shaft 29 is driven by the spur gears 31 from the shaft 10, and the drive shaft 29 is driven by the spur gears 32 also from the shaft 10. Thus both of the chains 26 and 27 are continuously rotated by the motor 9. A drive pin 33 is attached at the ends thereof to the chains 26 and 27, and this drive pin extends through a vertical slot 34 in the crosshead 16. Thus the crosshead 16 and the feed bar 14 will be continuously reciprocated as the chains 26 and 27 move from one end of their travel to the other.

To prevent leakage around the outside of the feed bar 14, that is, between the feed bar and the bore of the cylinder 1, we provide a plurality of spaced packing rings 35. These packing rings include an outer metal sleeve or ring 36, and this ring encloses a ring of a material which is thermally expansive, such as polytetrafluoroethylene 37. The packing rings 35 are positioned between segments of the metal liners 38, which are positioned within the cylinder 1 and between the walls of that cylinder and the feed bar 14. Higher temperatures will cause the rings 37 to expand against the feed bar 14 and will thus more tightly grip the feed bar and prevent leakage.

Figure 6:
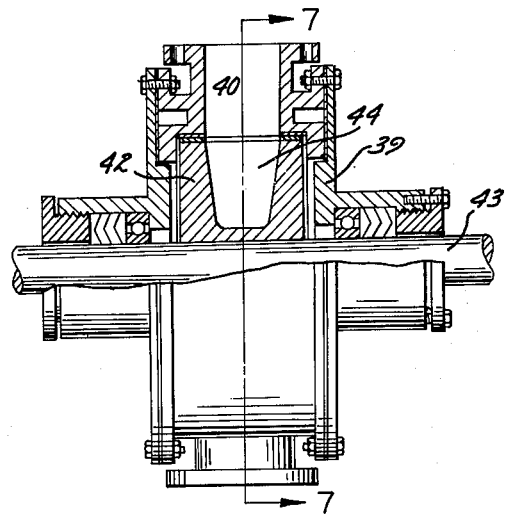
FIGURE 6 is a front elevation partly in section of a modified form of feeding piston.
Figure 8:
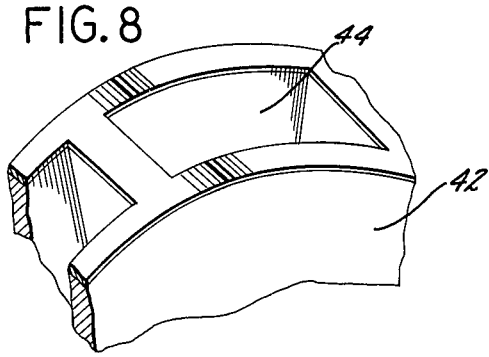
FIGURE 8 is a fragmentary perspective view of the rotary piston shown in FIGURE 6.

In the modified type of feed hopper 39, shown in FIGURES 6, 7 and 8, the feed hopper is provided with an intake port 40 and an outlet port 41. The hopper is mounted on top of the cylinder 1 in the same manner as the hopper 4. A rotary piston 42 is rotatably mounted within the hopper 39 on a shaft 43 which is journaled in the hopper. This shaft is driven in the same manner as the shaft 8, previously described, and performs the same function as the piston 5. A plurality of radial pockets 44 are formed in the piston 42, and these pockets receive material continuously from the intake 40 and feed it into the outlet 41 and thence into the feed hole 15 in the feed bar 14. Thus it will be evident that material is fed continuously from the intake to the outlet of the hopper 39, whereby the speed of the machine will be materially increased.

Figure 9:
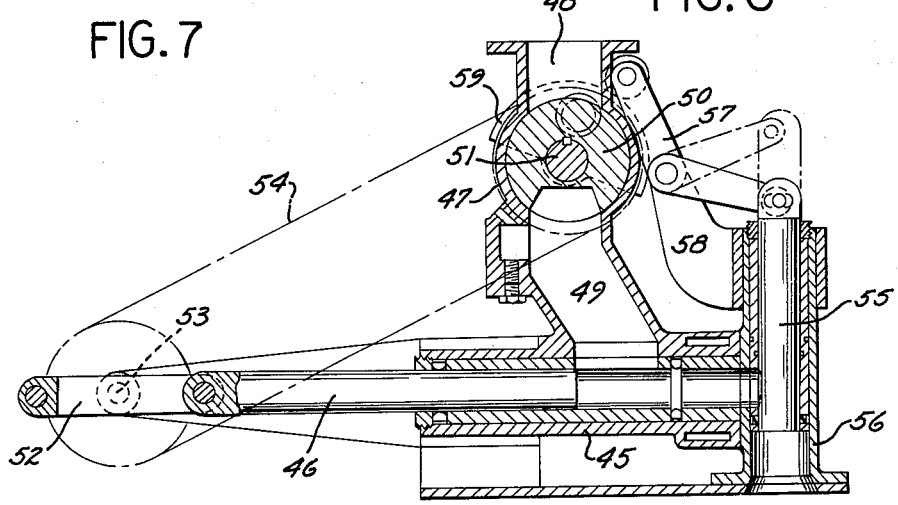
FIGURE 9 is a horizontal sectional view of a modified form of apparatus for the transfer of solid particles.

In the modified form of apparatus for airtight transfer of solid particles, shown in FIGURE 9, a horizontal cylinder 45 has a feed bar 46 reciprocally mounted therein. This feed bar extends horizontally through the cylinder 45 and feeds the material out of one end of the cylinder, as will be subsequently described. A hopper 47 is mounted on the cylinder 5 and is provided with an intake 48 and an outlet 49 through which the fed material passes. A rotary piston 50 is fixedly mounted on a drive shaft 5 which is driven by a suitable motor (not shown). The feed bar 46 is reciprocated by a crank 52 on the shaft 53 and this shaft is driven by the chain 54 from the drive shaft 51.

A feed plunger 55 is reciprocated within a vertical cylinder 56 by means of the bell crank 57, which is pivotally mounted on the bracket 58 at one end of the cylinder 56. One end of the bell crank 57 runs on a cam 59 on the shaft 51, thus continuously reciprocating the feed plunger 55. As the feed bar 46 is reciprocated it will move material from the outlet 49 and thence into the cylinder 56, at which time the plunger 55 will be raised to accommodate the material. As the feed bar 46 starts to retract, that is, as it moves to the left in FIGURE 9, the plunger 55 will be raised out of the way of the material, which is subsequently pushed into the cylinder 56 by the opposite movement of the feed bar 46; that is, the plunger 55 and the feed bar 46 are so timed that material is intermittently pushed into the cylinder 56 and then pushed out of that cylinder and into the apparatus which is to receive that material.

Having described our invention, we claim:

1. An apparatus for an airtight transfer of solid particles comprising,
    a cylinder, said cylinder having an inlet and an outlet port therein,
    a feed bar reciprocally mounted in said cylinder, said feed bar sealingly engaging the cylinder,
    a crosshead mounted on one end of the feed bar,
    a pintle projecting from the crosshead into one end of the feed bar to slidably fit therein, and spring means fitted between the pintle and the feed bar to yieldably couple the pintle and the feed bar,
    a drive chain mounted adjacent the crosshead,
    said crosshead having a vertical slot therein,
    a pin extending from the chain into the slot,
    drive means extending to the chain continuously rotating the chain,
    a feed hopper mounted on the cylinder over the inlet port thereof,
    feed means in said hopper to move solid particles therethrough,
    and drive means extending to said feed means.

2. An apparatus for an airtight transfer of solid particles comprising,
    a cylinder, said cylinder having an inlet and an outlet port therein,
    a feed bar reciprocally mounted in said cylinder, said feed bar sealingly engaging the cylinder,
    a crosshead mounted on one end of the feed bar,
    a pintle projecting from the crosshead into one end of the feed bar to slidably fit therein, and spring means fitted between the pintle and the feed bar to yieldably couple the pintle and the feed bar,
    a drive chain mounted adjacent the crosshead,
    said crosshead having a vertical slot therein,
    a pin extending from the chain into the slot,
    drive means extending to the chain continuously rotating the chain,
    a feed hopper mounted on the cylinder over the inlet port thereof,
    a rotary valve in said hopper, said rotary valve having a pocket therein to receive and feed solid particles to the inlet port,
    and drive means extending to said rotary valve.

3. An apparatus for an airtight transfer of solid particles comprising,
    a cylinder, said cylinder having an inlet and an outlet port therein,
    a feed bar reciprocally mounted in said cylinder, said feed bar sealingly engaging the cylinder,
    a crosshead,
    means yieldably mounting said crosshead at one end of said feed bar, including a pintle projecting from the crosshead into one end of the feed bar to slidably fit therein, and spring means fitted between the pintle and the feed bar to yieldably couple the pintle and the feed bar,
    a drive chain mounted adjacent the crosshead,
    said crosshead having a vertical slot therein,
    a pin extending from the chain into the slot,
    drive means extending to the chain continuously rotating the chain,
    a feed hopper mounted on the cylinder over the inlet port thereof,
    feed means in said hopper to move solid particles therethrough,
    and drive means extending to said feed means.

4. An apparatus for an airtight transfer of solid particles comprising,
    a cylinder, said cylinder having an inlet and an outlet port therein,
    a feed bar reciprocally mounted in said cylinder, said feed bar sealingly engaging the cylinder,
    a crosshead,
    means yieldably mounting said crosshead at one end of said feed bar, including a pintle projecting from the crosshead into one end of the feed bar to slidably fit therein, and spring means fitted between the pintle and the feed bar to yieldably couple the pintle and the feed bar,
    a drive chain mounted adjacent the crosshead,
    said crosshead having a vertical slot therein,
    a pin extending from the chain into the slot,
    drive means extending to the chain continuously rotating the chain,
    a feed hopper mounted on the cylinder over the inlet port thereof,
    a rotary valve in said hopper, said rotary valve having a pocket therein to receive and feed solid particles to the inlet port,
    and drive means extending to said rotary valve.

5. An apparatus for an airtight transfer of solid particles comprising,
- a cylinder, said cylinder having an inlet and an outlet port therein,
- a feed bar reciprocally mounted in said cylinder, said feed bar sealingly engaging the cylinder,
- a crosshead mounted on one end of the feed bar,
- a pintle projecting from the crosshead into one end of the feed bar to slidably fit therein, a transverse wall in the feed bar, said wall being spaced from the inner end of the pintle,
- spring means fitted between the pintle and said wall,
- a bar extending from the pintle through said wall, and spring means fitted between the inner end of said bar and said wall,
- a drive chain mounted adjacent the crosshead,
- said crosshead having a vertical slot therein,
- a pin extending from the chain into the slot,
- drive means extending to the chain continuously rotating the chain,
- a feed hopper mounted on the cylinder over the inlet port thereof,
- feed means in said hopper to move solid particles therethrough,
- and drive means extending to said feed means.

References Cited by the Examiner
UNITED STATES PATENTS

| | | | |
|---|---|---|---|
| 1,064,359 | 6/1913 | Middendorf | 74—37 X |
| 1,097,333 | 5/1914 | Kinmont | 74—37 |
| 1,762,443 | 6/1930 | Krueger | 222—252 |
| 2,161,190 | 6/1939 | Paull | 222—252 |
| 2,353,276 | 7/1944 | Stewart | 222—252 X |
| 2,408,285 | 9/1946 | Ashbaugh | 222—254 X |

M. HENSON WOOD, JR., *Primary Examiner.*

LOUIS J. DEMBO, *Examiner.*

A. N. KNOWLES, *Assistant Examiner.*